United States Patent Office 3,117,105
Patented Jan. 7, 1964

3,117,105
DIALDEHYDE POLYSACCHARIDE-PHENOL
DERIVATIVES
Peter J. Borchert, Elkhart, Ind., assignor to Miles Laboratories, Inc., Elkhart, Ind., a corporation of Indiana
No Drawing. Filed July 7, 1960, Ser. No. 41,255
10 Claims. (Cl. 260—55)

This invention relates to derivatives of dialdehyde polysaccharides with phenolic compounds. In one of its more particular aspects this invention relates to a method for preparing such useful dialdehyde polysaccharide-phenol derivatives.

Dialdehyde polysaccharides are readily obtained by oxidation of polysaccharides such as corn, wheat, potato or tapioca starches, celluloses, dextrins, dextrans, algins, inulins and related materials with periodic acid. This is a well known method for the preparation of dialdehyde polysaccharides and may be illustrated by means of the following Equation I:

(Equation I)

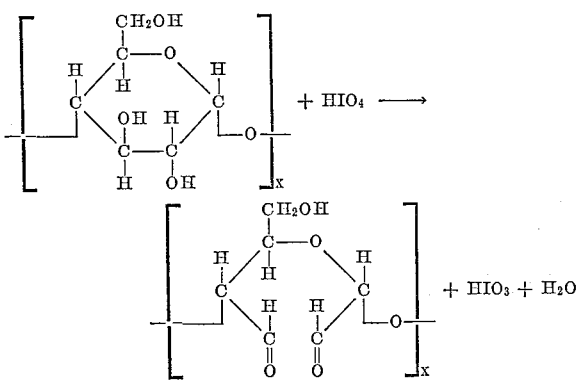

where $x$ represents the number of repeating polymer units. More recently electrolytic procedures have been used such as those exemplified by U.S. Patent No. 2,648,629 to William Dvonch and Charles L. Mehltretter and No. 2,713,553, No. 2,770,589 and No. 2,830,941 to Charles L. Mehltretter.

These dialdehyde polysaccharides can be reacted with phenolic compounds of various types to produce dialdehyde polysaccharide-phenol derivatives which are useful in a number of applications such as the formulation of resins and adhesives. A particularly useful application for these derivatives is in the provision of plywood adhesives.

Phenolic compounds which may be used for reaction with dialdehyde polysaccharides include phenol itself and various meta- and para-substituted phenols.

The ortho-substituted phenols are not satisfactory for use presumably because of some interference such as steric hindrance. The reaction between a dialdehyde polysaccharide, exemplified as dialdehyde starch and the phenols which may be used in the reaction may be illustrated by the following Equation II.

(Equation II)

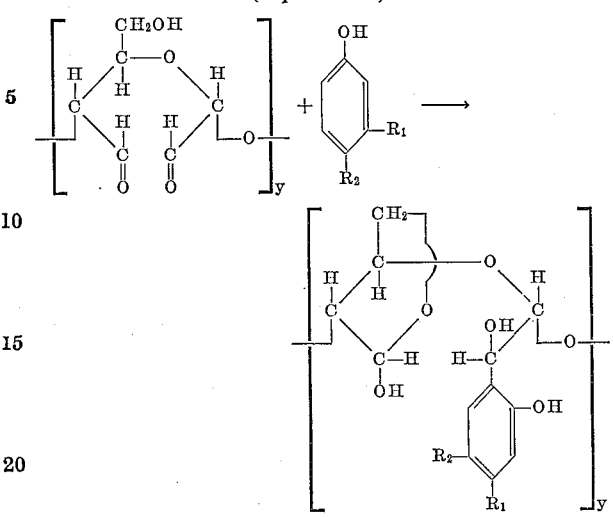

wherein $y$ represents the number of repeating units in the dialdehyde starch molecule which may vary from as few as about 20 to as many as several thousand, and $R_1$ and $R_2$ each represent H, $CH_3$, Cl or similar radicals, at least one of $R_1$ and $R_2$ being H.

Where $R_2$ is H the phenol may also be represented as attached to the carbonyl carbon of the dialdehyde starch as shown:

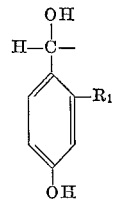

since the likelihood of condensation in the para position of the phenol is as great as ortho condensation.

The reaction between the dialdehyde polysaccharide and the phenol is catalyzed by means of a suitable condensation catalyst. For this purpose either an acid such as hydrochloric acid or a base such as sodium hydroxide, calcium oxide or the like may be used.

The medium for reaction may be an aqueous medium or only small amounts of water may be present. For example the major part of the reaction medium may be made up of a non-aqueous solvent such as ethylene glycol or similar materials. Evidently enough water for ionization purposes is present from the dialdehyde polysaccharide or from the use of reagents which are not absolutely anhydrous to permit the use of non-aqueous solvents.

The reaction between the dialdehyde polysaccharide and the phenol may be conveniently carried out at temperatures of from about 50° C. to 80° C. and preferably at temperatures of from about 55° C. to 70° C.

It is possible to mix the various reagents in any desired way in order to conduct the reaction. For instance the dialdehyde polysaccharide, phenol and catalyst may be heated together or the phenol heated with water and the dialdehyde polysaccharide and catalyst added later. Alternatively the phenol, catalyst and water or other reaction medium may be heated together and the dialdehyde polysaccharide added.

In most cases an increase in viscosity and a darkening of the reaction mixture occurs upon mixing and heating the reactants and catalyst. In some cases gelling is found to occur. The resulting dispersion is miscible with water and also partially miscible with lower aliphatic alcohols such as methanol, ethanol, isopropanol, n-propanol and others as well as with glycols such as ethylene glycol, propylene glycol and the like and with glycerol. If desired the product may be isolated as a solid by filtering, washing with methanol and with acetone and drying at elevated temperatures such as by oven drying at temperatures in the range of from about 100° C. to 110° C. If the product is dried at room temperature instead a resin which is hard, brittle and water insoluble results.

The invention will be better understood by reference to the following examples which are included for purposes of illustration and are not to be construed as in any way limiting the scope of the instant invention.

*Example I*

A mixture consisting of 250 ml. 1 N. hydrochloric acid, 49.7 g. phenol (0.524 mole) and 50 g. dialdehyde starch (0.262 mole) was stirred and heated at 55–60° C. for 30 minutes during which thickening occurred. The resulting mixture was filtered, washed with methanol, then acetone, and dried in an oven at 100–110° C. Yield: 70.6 g. (100% calculated for a reaction product having 1 mole phenol reacted per mole of polymer unit of the dialdehyde starch). The solid product was found to be soluble in sodium hydroxide indicating the presence of phenolic groups in the molecule.

The following example illustrates the use of a substituted phenol in preparing the dialdehyde polysaccharide-phenol derivatives of this invention.

*Example II*

A mixture consisting of 250 ml. 1 N. hydrochloric acid, 56.2 g. m-cresol and 50 g. dialdehyde starch (91% oxidation, 8% water) was heated with stirring at 50–70° C. for 15 minutes. The mixture thickened and formed a soft transparent mass. Upon drying at room temperature the product formed a hard and brittle water insoluble resin.

The following example illustrates the use of a basic catalyst in preparing the dialdehyde polysaccharide-phenol derivatives of the invention.

*Example III*

A mixture of 204 g. phenol and 204 ml. deionized water was heated at 75–80° C. To the resulting homogeneous solution was added with vigorous stirring a dry blend of 400 g. dialdehyde starch (94.4% oxidation, 7.8% water) and 2 g. calcium oxide within 1 minute. No swelling or gelling occurred. The resulting mixture was stirred for an additional 15–20 minutes at 75–80° C. and then allowed to cool slowly to room temperature. The highly viscous brownish dispersion obtained was miscible with water in all proportions; miscible with an equal volume of methanol, ethanol, isopropanol, n-propanol, ethylene glycol, propylene glycol and glycerol.

The following example illustrates the isolation of dialdehyde polysaccharide-phenol derivatives as a solid product.

*Example IV*

A mixture of 73.8 g. phenol (technical grade), 90 ml. deionized water and 1.0 g. calcium oxide was heated at 75° C. until a homogeneous solution was obtained. Then 150 g. dialdehyde starch (90% oxidation, 10% water) was added with vigorous stirring within a period of 2 minutes. Stirring was continued for 10 minutes and the resulting brownish viscous liquid was cooled. Solids content: 66.5%. The resin product was miscible with water in all proportions. Addition of methanol or acetone produced a yellow solid which was soluble in water.

Similar results were obtained using 5 ml. 30% sodium hydroxide as catalyst instead of calcium oxide.

The following example illustrates the use of a nonaqueous solvent for carrying out the process of this invention.

*Example V*

A mixture of 102 g. phenol, 120 g. ethylene glycol and 3 g. calcium oxide was heated with stirring at 75–80° C. 200 g. dialdehyde starch (94.4% oxidation, 7.8% water) was added within 2 minutes. Swelling and thickening of the reaction mass occurred followed by an exothermic reaction during which the temperature rose to 92° C. After stirring for an additional 5 minutes the mixture was allowed to cool. The reaction product can be treated as in the foregoing examples.

The following example illustrates the use of another basic catalyst in preparing the dialdehyde polysaccharide-phenol derivatives of this invention.

*Example VI*

A mixture of 24.6 g. phenol and 0.5 g. sodium hydroxide dissolved in 40 ml. water was heated at 60–70° C. at pH 8. A total of 50 g. dialdehyde starch (86.7% oxidation, 8% water) was added with stirring over a period of 15 minutes. Final pH was 6. When the reaction was completed the resulting brown colored liquid was cast into films and cured at 70–80° C. for a period of 2–3 hours. A hard, brittle, water resistant resin resulted.

Similar results were obtained using 0.2 g. sodium hydroxide dissolved in 10 ml. water and 0.5 g. sodium hydroxide dissolved in 20 ml. water.

The following example illustrates the preparation of a dialdehyde polysaccharide-phenol derivative wherein the phenol is p-chlorophenol.

*Example VII*

A mixture of 99 g. p-chlorophenol, 90 ml. water and 5 ml. 30% sodium hydroxide was heated at 75–80° C. The pH of the mixture was pH 6. To the heated mixture was added 150 g. of dialdehyde starch (91.6% oxidation, 9.6% water) with stirring within 30 seconds. No swelling or gelling occurred. The reaction mixture was stirred for an additional period of 10–15 minutes at 70–75° C. and then allowed to cool. A reddish brown dispersion of pH 4 resulted. 3 g. phosphoric acid were added as curing catalyst lowering the pH to 1.5 and films were cast and cured under various conditions of temperature and time from 50° C. to 100° C. and 30 minutes to 1 hour. Clear films having maximum water resistance were obtained by curing at 80–90° C. for 30 minutes.

In summary dialdehyde polysaccharides are reacted with phenol or various meta- and para-substituted phenols to give dialdehyde polysaccharide-phenol derivatives which are useful in resins and adhesives formulation.

Other embodiments than those specifically described may of course, be used in the practice of this invention and are intended to be included within the scope thereof, which is defined in the appended claims.

What is claimed is:

1. A product resulting from the reaction of a dialdehyde polysaccharide with a phenolic compound selected from the group consisting of compounds of the formula

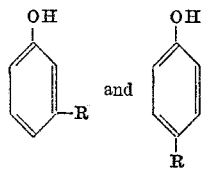

wherein R is a member selected from the group consisting of hydrogen, halogen and lower alkyl at a temperature of about from 50° C. to 80° C., in the presence of a condensation catalyst selected from the group consisting of sodium hydroxide, calcium oxide and hydrochloric acid.

2. A process for the preparation of a dialdehyde polysaccharide-phenol derivative which comprises reacting a dialdehyde polysaccharide with a phenolic compound selected from the group consisting of compounds of the formula

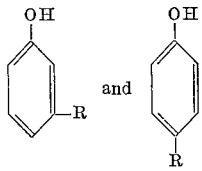

wherein R is a member selected from the group consisting of hydrogen, halogen and lower alkyl, at a temperature of about from 50° C. to 80° C., in the presence of a condensation catalyst selected from the group consisting of sodium hydroxide, calcium oxide and hydrochloric acid.

3. A product according to claim 1 wherein the dialdehyde polysaccharide is dialdehyde starch.

4. A product according to claim 1 wherein the phenolic compound is phenol.

5. A product according to claim 1 wherein the phenolic compound is m-cresol.

6. A product according to claim 1 wherein the phenolic compound is p-chlorophenol.

7. A process according to claim 2 wherein the dialdehyde polysaccharide is dialdehyde starch.

8. A process according to claim 2 wherein the phenolic compound is phenol.

9. A process according to claim 2 wherein the phenolic compound is m-cresol.

10. A process according to claim 2 wherein the phenolic compound is p-chlorophenol.

References Cited in the file of this patent

UNITED STATES PATENTS

| 2,606,188 | Yelland | Aug. 5, 1952 |
| 2,702,823 | Smith et al. | Feb. 22, 1955 |
| 2,894,945 | Hofreiter et al. | July 14, 1959 |

FOREIGN PATENTS

| 709,495 | Germany | Aug. 18, 1941 |

OTHER REFERENCES

Sloan et al.: "Properties of Periodate Oxidized Starch," Industrial and Engineering Chemistry, July 1956, pages 1165–1172.

Abstract of Belgian Patent 445,839.